United States Patent
Feng et al.

(10) Patent No.: US 10,082,635 B2
(45) Date of Patent: Sep. 25, 2018

(54) FIBER SPLICE AND DISTRIBUTION MODULE AND FIBER SPLICE AND DISTRIBUTION FRAME

(71) Applicant: Huawei Technologies Co., Ltd., Shenzhen (CN)

(72) Inventors: Wanchun Feng, Shenzhen (CN); Siwen Shu, Wuhan (CN); Mingsong Guo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/827,462

(22) Filed: Nov. 30, 2017

(65) Prior Publication Data

US 2018/0095232 A1    Apr. 5, 2018

Related U.S. Application Data

(63) Continuation of application No. PCT/CN2016/101037, filed on Sep. 30, 2016.

(51) Int. Cl.
*G02B 6/44* (2006.01)
*G02B 6/38* (2006.01)

(52) U.S. Cl.
CPC ......... *G02B 6/4454* (2013.01); *G02B 6/3897* (2013.01); *G02B 6/4452* (2013.01); *G02B 6/3825* (2013.01); *G02B 6/4459* (2013.01)

(58) Field of Classification Search
None
See application file for complete search history.

(56) References Cited

U.S. PATENT DOCUMENTS

| 5,647,045 A * | 7/1997 | Robinson | G02B 6/4454 385/135 |
| 2010/0142910 A1 | 6/2010 | Hill et al. | |

(Continued)

FOREIGN PATENT DOCUMENTS

| CN | 201622373 U | 11/2010 |
| CN | 102230995 A | 11/2011 |

(Continued)

OTHER PUBLICATIONS

Machine Translation and Abstract of Chinese Publication No. CN102230995, Nov. 2, 2011, 5 pages.

(Continued)

*Primary Examiner* — Chad H Smith
(74) *Attorney, Agent, or Firm* — Conley Rose, P.C.

(57) ABSTRACT

The present disclosure provides a fiber splice and distribution apparatus and a fiber splice and distribution frame. The fiber splice and distribution apparatus includes a housing and a splice tray connected to the housing, where multiple first adapters are provided at one end of the housing; a movable plate is provided at the other end of the housing, an adapter mounting hole is provided on the movable plate, the adapter mounting hole is configured to mount a second adapter, and the movable plate is detachably connected to the housing. When the movable plate is connected to the housing of the fiber splice and distribution apparatus, distribution may be performed for different types of adapters by using a branch jumper. When the movable plate is detached, the pigtail may be spliced to an external optical cable. The fiber splice and distribution module has relatively rich functions.

12 Claims, 5 Drawing Sheets

(56) References Cited

U.S. PATENT DOCUMENTS

2011/0249941 A1  10/2011  Allwood et al.
2013/0004125 A1   1/2013  Abbiati et al.

FOREIGN PATENT DOCUMENTS

| CN | 104459920 A | 3/2015 |
| CN | 105093416 A | 11/2015 |
| EP | 2216665 A1 | 8/2010 |
| WO | 2016123175 A1 | 8/2016 |
| WO | 2016132216 A1 | 8/2016 |

OTHER PUBLICATIONS

Machine Translation and Abstract of Chinese Publication No. CN104459920, Mar. 25, 2015, 11 pages.
Machine Translation and Abstract of Chinese Publication No. CN105093416, Nov. 25, 2015, 8 pages.
Machine Translation and Abstract of Chinese Publication No. CN201622373, Nov. 3, 2010, 6 pages.
Foreign Communication From a Counterpart Application, PCT Application No. PCT/CN2016/101037, International Search Report dated Jun. 22, 2017, 7 pages.
Foreign Communication From a Counterpart Application, PCT Application No. PCT/CN2016/101037, Written Opinion dated Jun. 22, 2017, 3 pages.
Foreign Communication From a Counterpart Application, European Application No. 16893799.3, Extended European Search Report dated Jun. 25, 2018, 8 pages.

\* cited by examiner

FIBER SPLICE AND DISTRIBUTION MODULE AND FIBER SPLICE AND DISTRIBUTION FRAME

CROSS-REFERENCE TO RELATED APPLICATIONS

This application is a continuation of International Application No. PCT/CN2016/101037, filed on Sep. 30, 2016, the disclosure of which is hereby incorporated by reference in its entirety.

TECHNICAL FIELD

The present disclosure relates to the field of communications technologies, and in particular, to a fiber splice and distribution module and a fiber splice and distribution frame.

BACKGROUND

A fiber splice and distribution module is an important component in an optical distribution frame and an optical cross connection cabinet, and is mainly used to implement functions of splicing between an external optical cable and a pigtail, and connecting the spliced pigtail to a fiber patch cord by using an adapter. In actual use, the fiber splice and distribution module needs to be inserted into a fiber splice and distribution frame, and then the fiber splice and distribution frame is installed on the optical distribution frame or in the optical cross connection cabinet, so that a connection between an optical device and a fiber link may be implemented.

In a related technology, usually two splice and distribution modules may be inserted into a 1-U (that is, a height is 44.45 millimeters, and a width is 482.6 millimeters) fiber splice and distribution frame. Each splice and distribution module may accommodate twelve square connector (SC) adapters or twelve Lucent connector (LC) duplex adapters. In use, an external optical cable may be spliced to one end of a pigtail by using a splice tray in the splice and distribution module. The other end of the pigtail has multiple adapter interfaces, and the adapter interfaces can be connected to ends of the multiple adapters in a one-to-one correspondence. The other ends of the multiple adapters are used to connect to a fiber patch cord. The fiber patch cord may be connected to an optical device. In this way, the connection between the optical device and the fiber link may be implemented.

However, the fiber splice and distribution module in the related technology can implement only functions of splicing between the external optical cable and the pigtail, and connecting the spliced pigtail to the fiber patch cord. The fiber splice and distribution module has relatively simple functions.

SUMMARY

To resolve a problem in a related technology that a fiber splice and distribution module has relatively simple functions, the present disclosure provides a fiber splice and distribution module and a fiber splice and distribution frame.

According to a first aspect, a fiber splice and distribution module is provided, where the fiber splice and distribution module includes a housing and a splice tray connected to the housing, where multiple first adapters are provided at one end of the housing; a movable plate is provided at the other end of the housing, an adapter mounting hole is provided on the movable plate, the adapter mounting hole is configured to mount a second adapter, and the movable plate is detachably connected to the housing; and one end of the second adapter is configured to connect to an external optical cable, and the other end is configured to connect to the multiple first adapters by using a branch jumper; and when the movable plate is detached, an opening is formed at the other end of the housing, the external optical cable can enter the housing through the opening, and is spliced to one end of a pigtail by using the splice tray, and the other end of the pigtail is configured to connect to the multiple first adapters.

In the fiber splice and distribution module provided in the present disclosure, when the movable plate is connected to the housing, distribution may be performed for different types of adapters by using the branch jumper. When the movable plate is detached, functions of splicing the external optical cable to the pigtail, and connecting the spliced pigtail to a fiber patch cord by using the multiple first adapters may be implemented. The fiber splice and distribution module has relatively rich functions.

Optionally, the splice tray is detachably connected to the housing, where when the movable plate is not connected to the housing, the splice tray is disposed in the housing, and when the movable plate is connected to the housing, the splice tray is detached from the fiber splice and distribution module.

Optionally, the movable plate may be a knock-out hole. That is, the movable plate cannot be mounted again after being detached from the housing. Compared with a structure that can be repeatedly mounted, design of the knock-out hole may reduce manufacturing costs of the fiber splice and distribution module.

Optionally, the housing includes a baseplate and a baffle plate disposed around the baseplate; the multiple first adapters are provided on the baffle plate at the one end of the housing; and the movable plate is provided on the baffle plate at the other end of the housing.

Optionally, the fiber splice and distribution module further includes a fiber post and a cover, where the fiber post is disposed on the baseplate, and is configured to store the pigtail or the branch jumper; the splice tray is disposed above the fiber post, is movably connected to the housing, and is capable of turning over in a direction away from the baseplate; and the cover is disposed on a plane on which the opening of the housing is located, is movably connected to the baffle plate at the one end of the housing, and is capable of turning over in a direction away from the baseplate. The cover may be a transparent cover, so as to observe components in the housing of the fiber splice and distribution module.

Optionally, the first adapter includes any one of a SC adapter, a LC duplex adapter, or a ferrule connector (FC) adapter; and the second adapter includes a multi-fiber push on (MPO) adapter.

Optionally, two adapter mounting holes are provided on the movable plate. 12 first adapters are disposed at the one end of the housing. Two MPO adapters may be mounted by using the two adapter mounting holes. In this way, distribution for one MPO adapter and 12 SC adapters or 12 FC adapters may be implemented, or distribution for two MPO adapters and 12 LC duplex adapters may be implemented.

According to a second aspect, a fiber splice and distribution frame is provided, where the fiber splice and distribution frame includes a splice and distribution frame body and at least one fiber splice and distribution module according to the first aspect inserted into the splice and distribution frame body.

Optionally, an opening is provided at a position near a first adapter on the splice and distribution frame body, a cabling ring is disposed on one side of the opening, a fiber patch cord can pass through the cabling ring and the opening on the splice and distribution frame body, and is connected to the first adapter in the splice and distribution module. The multiple first adapters need to connect to multiple fiber patch cords, and the cabling ring can put the multiple fiber patch cords in order. Therefore, excessive disorder of the fiber patch cords is avoided.

Optionally, the splice and distribution frame body includes a baseplate and a baffle plate disposed around the baseplate; and the cabling ring is disposed on each of outer sides of a first baffle plate and a second baffle plate in the splice and distribution frame body, where the first baffle plate and the second baffle plate are disposed opposite to each other, and are both perpendicular to a mounting plane of the first adapters.

Optionally, a movable clip is provided on the cabling ring, where the movable clip is configured to open or close the cabling ring. The cabling ring can be conveniently opened or closed by using the movable clip, so as to arrange the multiple fiber patch cords.

Optionally, the fiber splice and distribution frame further includes a tray; the tray is disposed on the baseplate of the fiber splice and distribution frame, and is movably connected to the baseplate; and the fiber splice and distribution module is inserted on the tray.

Optionally, the splice and distribution frame body has a height of 44.45 millimeters and a width of 482.6 millimeters. That is, the fiber splice and distribution frame may be a 1-U splice and distribution frame. In the splice and distribution frame body, four fiber splice and distribution modules are sequentially inserted along a width direction of the splice and distribution frame body. Four fiber splice and distribution modules can be inserted into the 1-U fiber splice and distribution frame. Compared with the related technology in which only two splice and distribution modules can be inserted, a capacity of the fiber splice and distribution frame is effectively increased.

Optionally, the fiber splice and distribution frame further includes an upper cover; and the upper cover is disposed on a plane on which the opening of the splice and distribution frame body is located, and is detachably connected to the splice and distribution frame body.

To sum up, the present disclosure provides a fiber splice and distribution module and a fiber splice and distribution frame. Multiple first adapters are provided at one end of a housing of the fiber splice and distribution module, and a movable plate is provided at the other end. An adapter mounting hole is provided on the movable plate. The adapter mounting hole can mount a second adapter. When the movable plate is connected to the housing, distribution may be performed for different types of adapters by using the branch jumper. When the movable plate is detached, functions of splicing the external optical cable to the pigtail, and connecting the spliced pigtail to a fiber patch cord by using the first adapters may be implemented. The fiber splice and distribution module has relatively rich functions.

It should be understood that the foregoing general description and the following detailed description are merely examples and explanations, and cannot constitute limitations on the present disclosure.

BRIEF DESCRIPTION OF DRAWINGS

To describe the technical solutions in the embodiments of the present disclosure more clearly, the following briefly describes the accompanying drawings for describing the embodiments. The accompanying drawings in the following description show merely some embodiments of the present disclosure, and a person of ordinary skill in the art may still derive other drawings from these accompanying drawings without creative efforts.

The foregoing accompanying drawings show specific embodiments of the present disclosure, and more detailed descriptions are provided in the following. The accompanying drawings and text descriptions are not intended to limit the scope of the idea of the present disclosure in any manner, but are intended to describe the concept of the present disclosure to a person skilled in the art with reference to particular embodiments.

DESCRIPTION OF EMBODIMENTS

To make the objectives, technical solutions, and advantages of the present disclosure clearer, the following further describes the embodiments of the present disclosure in detail with reference to the accompanying drawings.

Figure 1:
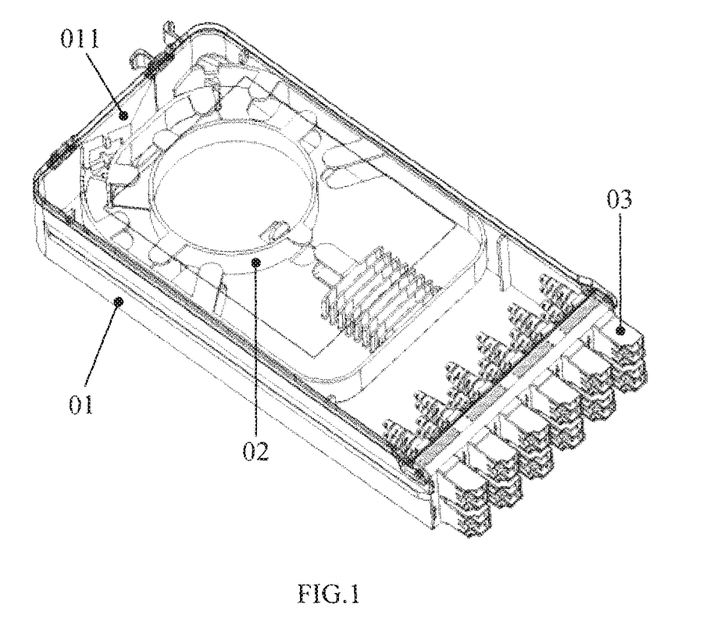
FIG. 1 is a schematic structural diagram of a fiber splice and distribution module according to an embodiment of the present disclosure.

FIG. 1 is a schematic structural diagram of a fiber splice and distribution module according to an embodiment of the present disclosure. As shown in FIG. 1, the fiber splice and distribution module may include a housing 01 and a splice tray 02 connected to the housing.

Figure 2:
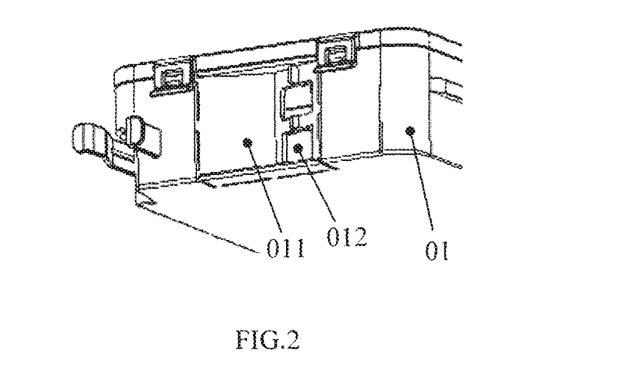
FIG. 2 is a schematic structural diagram of a movable plate according to an embodiment of the present disclosure.

Multiple first adapters 03 are provided at one end of the housing 01. A movable plate 011 is provided at the other end of the housing 01. As shown in FIG. 2, an adapter mounting hole 012 is provided on the movable plate 011. The adapter mounting hole 012 is configured to mount a second adapter. The movable plate 011 is detachably connected to the housing 01.

Figure 3:
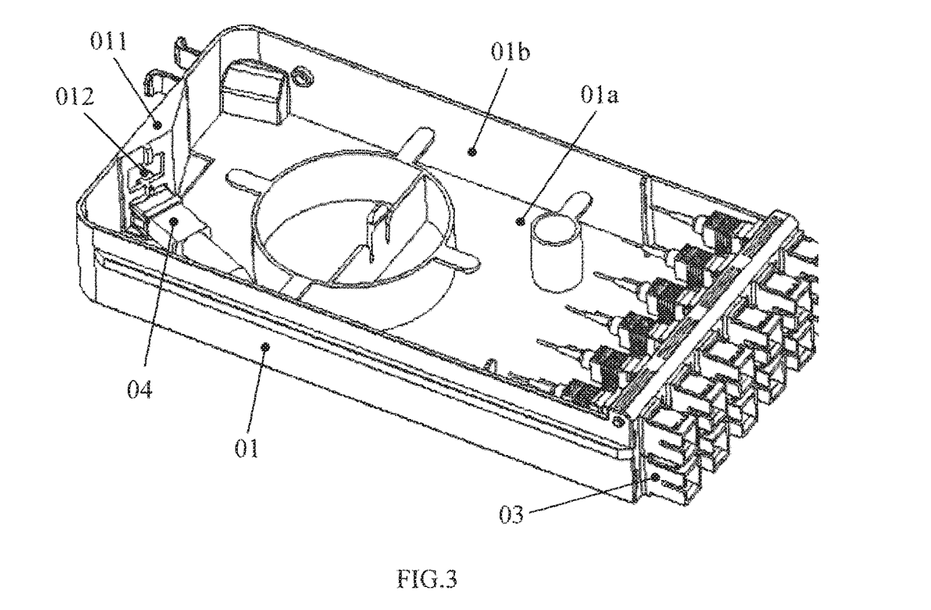
FIG. 3 is a schematic structural diagram of another fiber splice and distribution module according to an embodiment of the present disclosure.
Figure 4:
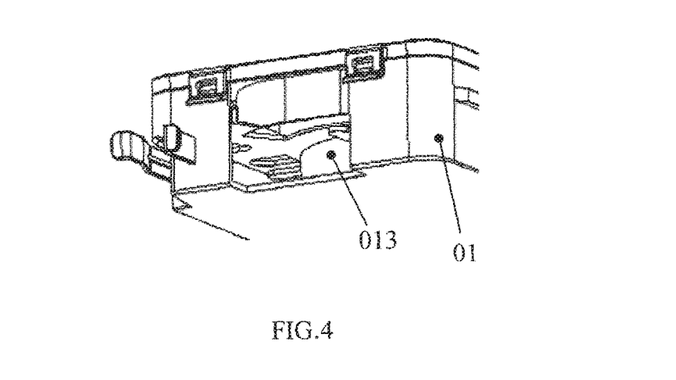
FIG. 4 is a schematic structural diagram of a part of a fiber splice and distribution module according to an embodiment of the present disclosure.

Referring to FIG. 3, when the movable plate 011 is connected to the housing 01, and the second adapter 04 is mounted in the adapter mounting hole 012, one end of the second adapter 04 is configured to connect to an external optical cable, and the other end is configured to connect to the multiple first adapters 03 by using a branch jumper;

when the movable plate 011 is detached, as shown in FIG. 4, an opening 013 is formed at the other end of the housing 01. The external optical cable can enter the housing through the opening 013, and is spliced to one end of a pigtail by using the splice tray 02 shown in FIG. 1. The other end of the pigtail is configured to connect to the multiple first adapters 03.

To sum up, a detachable movable plate is provided on the fiber splice and distribution module provided in this embodiment of the present disclosure. An adapter mounting hole configured to mount a second adapter is provided on the movable plate. When the movable plate is connected to a housing of the fiber splice and distribution module, distribution may be performed for different types of adapters by using a branch jumper. When the movable plate is detached, functions of splicing an external optical cable to a pigtail, and connecting the spliced pigtail to a fiber patch cord by using first adapters may be implemented. The fiber splice and distribution module has relatively rich functions.

Figure 5:
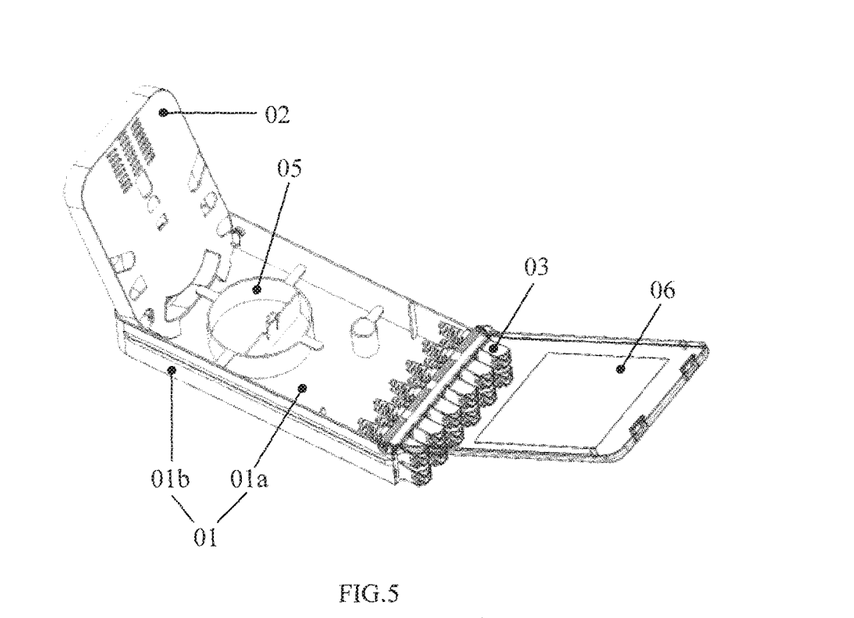
FIG. 5 is a schematic structural diagram of a fiber splice and distribution module in an open state according to an embodiment of the present disclosure.

Further, in this embodiment of the present disclosure, as shown in FIG. 3, the housing 01 may include a baseplate Ola and a baffle plate Olb disposed around the baseplate. The multiple first adapters 03 are provided on the baffle plate at the one end of the housing. The movable plate 011 is provided on the baffle plate at the other end of the housing 01. Referring to FIG. 5, the splice tray 02 is detachably connected to the housing 01.

Figure 6:
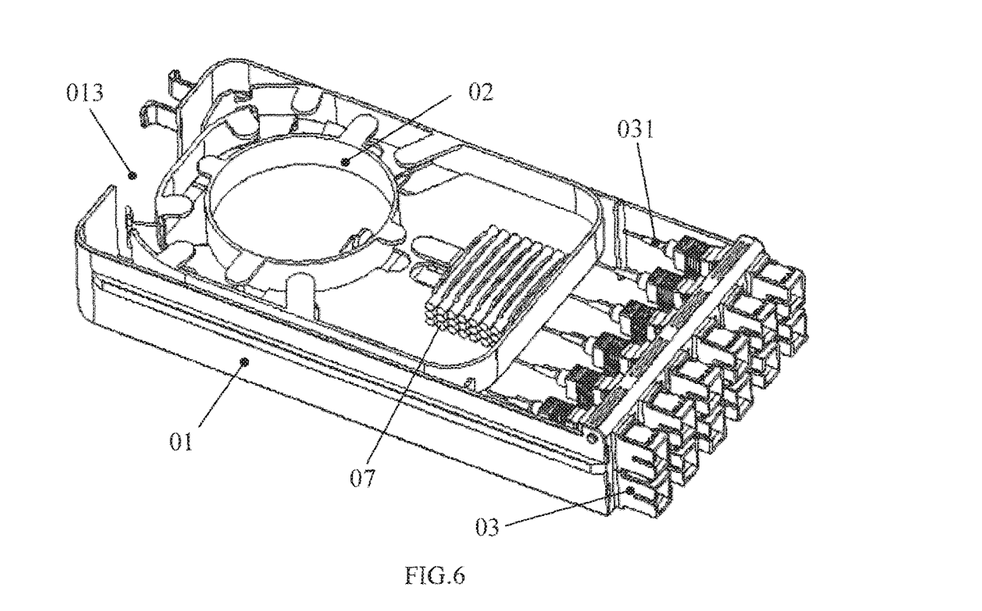
FIG. 6 is a schematic structural diagram of still another fiber splice and distribution module according to an embodiment of the present disclosure.

According to one aspect, when the movable plate 011 is detached from the housing 01, that is, when the movable plate 011 is not connected to the housing 01, as shown in FIG. 6, the splice tray 02 may be disposed in the housing 10. In this case, the external optical cable may enter the housing through the opening 013 at the other end of the housing, and the fiber splice and distribution module may splice the external optical cable to the pigtail by using the splice tray 02. The other end of the pigtail can be connected to the multiple first adapters 03, and the other ends of the multiple first adapters 03 can be connected to an optical device by using the fiber patch cord. Therefore, a connection between the external optical cable and the optical device can be implemented. In addition, as shown in FIG. 6, when the external optical cable is spliced to the pigtail by using the splice tray 02, a splicing protection tube 07 may be further provided on the fiber splice and distribution module. The splicing protection tube 07 may be sleeved over the spliced fiber to protect a splice portion between the external optical cable and the pigtail.

It should be noted that in this embodiment of the present disclosure, the first adapter may include any one of an SC adapter, an LC duplex adapter, or an FC adapter.

In an embodiment, as shown in FIG. 6, the first adapters 03 disposed at the one end of the housing 01 may be 12 SC adapters. In this case, a bare fiber of a 12-fiber optical cable may be led into the splice tray 02 through the opening 013 on the housing 01. Then, one end of a 12-fiber SC pigtail (that is, an interface type at one end of the pigtail is an SC type) is correspondingly connected to the 12 SC adapters (for example, connected to the SC adapters by using an SC connector 031). The pigtail is coiled around a fiber post in the housing, then is led into the splice tray 02, and is spliced to the 12-fiber bare fiber. In this way, the 12-fiber optical cable may be spliced to the SC pigtail.

Figure 7:
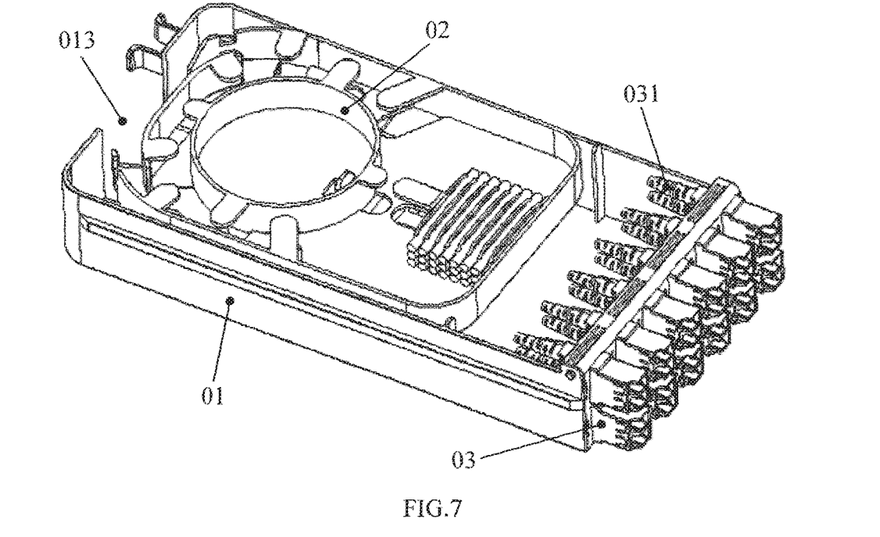
FIG. 7 is a schematic structural diagram of yet another fiber splice and distribution module according to an embodiment of the present disclosure.

In another optional implementation, as shown in FIG. 7, the first adapters 03 disposed at the one end of the housing 01 may be 12 LC duplex adapters. In this case, bare fibers of two 12-fiber optical cable may be led into the splice tray 02 through the opening 013 on the housing 01. Then, one end of a 24-fiber LC pigtail is correspondingly connected to the 12 LC duplex adapters (for example, connected to the LC duplex adapters by using an LC connector 031). The pigtail is coiled around the fiber post in the housing, then is led into the splice tray 02, and is spliced to the two 12-fiber bare fibers. In this way, the two 12-fiber optical cables may be spliced to the LC pigtail.

According to another aspect, as shown in FIG. 3, when the movable plate 011 keeps the connection to the housing 01, the splice tray 02 is detached from the fiber splice and distribution module. That is, the splice tray 02 may be detached from the housing 01. In this case, the second adapter 04 may be mounted on the movable plate 011 in the fiber splice and distribution module. A connection between the second adapter 04 and the multiple first adapters 03 is implemented by using a fiber patch cord. One end of the second adapter 04 can be connected to the external optical cable, and the other ends of the multiple first adapters 03 can be connected to the optical device by using the fiber patch cord. Therefore, a connection between the external optical cable and the optical device can also be implemented.

In the embodiments of the present disclosure, the second adapter may be an MPO adapter. In addition, as shown in FIG. 2, two adapter mounting holes 012 may be provided on the movable plate 011.

Figure 8:
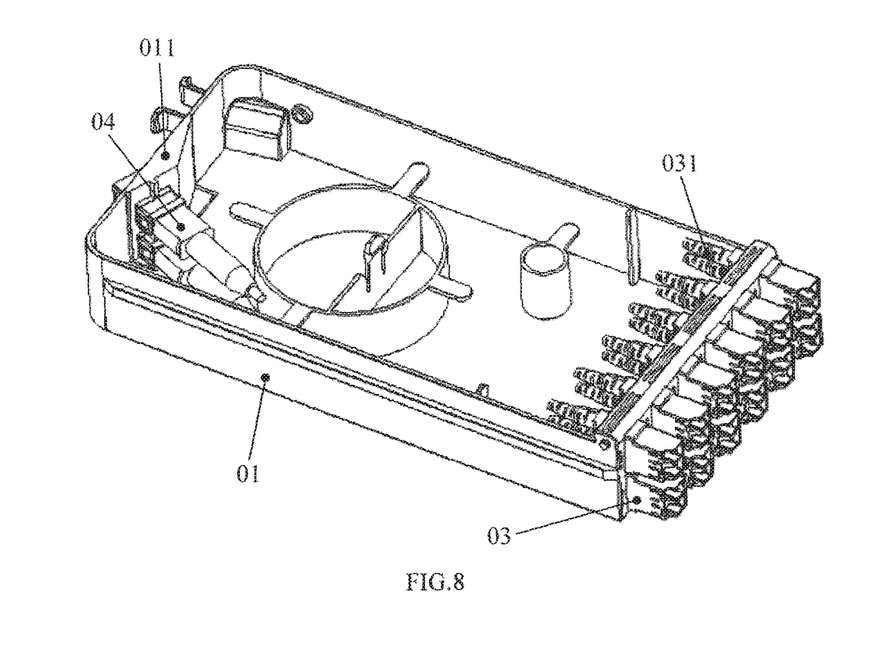
FIG. 8 is a schematic structural diagram of yet another fiber splice and distribution module according to an embodiment of the present disclosure.

In an embodiment, as shown in FIG. 3, 12 SC adapters 03 are provided at one end of the housing 01. An MPO adapter 04 is mounted in the adapter mounting hole. The MPO adapter 04 may be correspondingly connected to the 12 SC adapters by using one branch jumper. In this way, a function of MPO-12SC distribution may be implemented. In another optional implementation, as shown in FIG. 8, 12 LC duplex adapters 03 may be provided at one end of the housing 01. Two MPO adapters 04 are mounted in the adapter mounting hole. The two MPO adapters may be correspondingly connected to the 12 LC duplex adapters by using two branch jumpers. In this way, a function of 2MPO-24LC distribution may be implemented.

The second adapter may be another type of multi-channel adapter. In addition to the SC adapter and the LC adapter in the foregoing embodiment, the first adapter may further be another type of single-channel adapter, for example, an FC adapter. Types of the first adapter and the second adapter are not specifically limited in this embodiment of the present disclosure.

In an embodiment of the present disclosure, referring to FIG. 2, the movable plate 011 may be a knock-out hole. Most hole edges of the knock-out hole are cut off from the housing 01, and only some connection points are reserved. When the movable plate 011 needs to be detached, a complete opening 013 shown in FIG. 4, FIG. 6, or FIG. 7 may be obtained provided that the connection points are broken by using a tool such as a hammer or pliers. That is, the movable plate 011 cannot be mounted again after being detached from the housing 01. Compared with a structure that can be repeatedly mounted, design of the knock-out hole may effectively reduce manufacturing costs of the fiber splice and distribution module.

When the fiber splice and distribution module is used, a connection manner of the external optical cable and the optical device may be first determined. When distribution needs to be performed for different types of adapters by using a fiber patch cord so as to implement the connection between the external optical cable and the optical device, the movable plate may be reserved, and a splice plate 02 is detached from the housing. When a connection needs to be performed by splicing the external optical cable to the pigtail, the movable plate may be directly knocked out. The fiber splice and distribution module provided in this embodiment of the present disclosure may implement the connection between the external optical cable and the optical device in different manners. The fiber splice and distribution module has relatively rich functions, and use flexibility is relatively high.

Further, as shown in FIG. 5, the fiber splice and distribution module further includes a fiber post 05 and a cover 06. The fiber post 06 is disposed on the baseplate 0la, and is configured to store the pigtail or the branch jumper. The splice tray 02 is disposed above the fiber post 05, is movably connected to the housing 01, and is capable of turning over in a direction away from the baseplate 01a.

For example, as shown in FIG. 5, a columnar projecting structure may be disposed on each of two sides of the splice tray 02. Grooves are formed at positions corresponding to the columnar projecting structures on an internal side of the housing 01. The columnar projecting structures on the two sides of the splice tray 02 can be inserted into the grooves. The columnar projecting structures can rotate in the grooves. Therefore, the splice tray 02 may be turned over in a direction away from the baseplate 01a. As shown in FIG. 5, when the splice tray 02 is in an open state, the fiber post 05 on the bottom of the splice tray 02 is exposed, so that operating personnel can coil the remaining pigtail or branch jumper around the fiber post 05.

Further, as shown in FIG. 5, the cover 06 is disposed on a plane on which the opening of the housing 01 is located, and is movably connected to the baffle plate at the one end of the housing 01, for example, may be movably connected to the baffle plate on which the first adapters 03 are provided. The cover 06 is capable of turning over in a direction away from the baseplate 01a, so that operating personnel can operate and maintain components in the housing 01. The cover 06 may be a transparent cover, so as to observe components in the housing of the fiber splice and distribution module.

It should be noted that all components of the fiber splice and distribution module provided in this embodiment of the present disclosure may be made of plastic. All the components may be assembled in a snap fitting manner, and no screw needs to be used. The assembly is simple, and costs are relatively low.

To sum up, a detachable movable plate is provided on the fiber splice and distribution module provided in this embodiment of the present disclosure. An adapter mounting hole configured to mount a second adapter is provided on the movable plate. When the movable plate is connected to a housing of the fiber splice and distribution module, distribution may be performed for different types of adapters by using a branch jumper. When the movable plate is detached, functions of splicing an external optical cable to a pigtail, and connecting the spliced pigtail to a fiber patch cord by using first adapters may be implemented. The fiber splice and distribution module has relatively rich functions.

Figure 9:
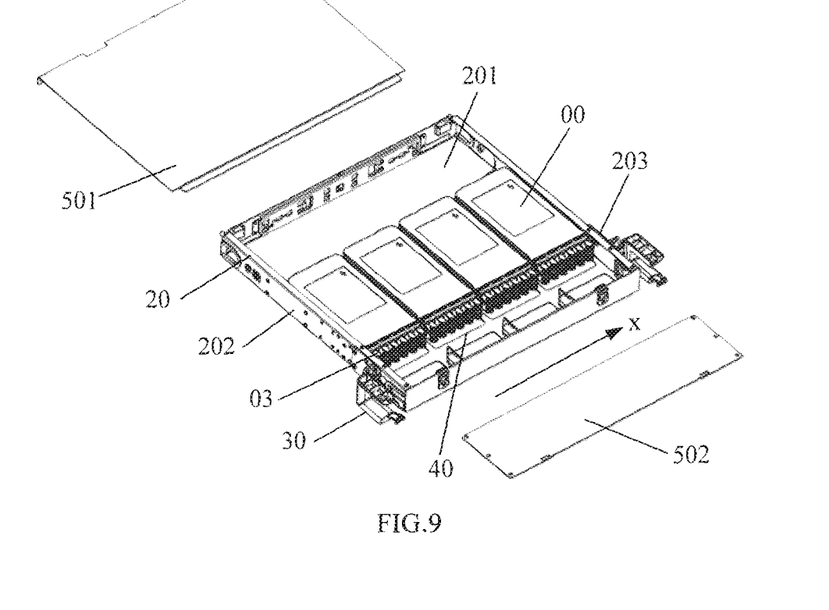
FIG. 9 is a schematic structural diagram of a fiber splice and distribution frame according to an embodiment of the present disclosure.

FIG. 9 is a schematic structural diagram of a fiber splice and distribution frame according to an embodiment of the present disclosure. As shown in FIG. 9, the fiber splice and distribution frame may include a splice and distribution frame body 20 and at least one fiber splice and distribution module 00 inserted into the splice and distribution frame body 20. The fiber splice and distribution module 00 may be the fiber splice and distribution module shown in any one of FIG. 1 to FIG. 8.

As shown in FIG. 9, multiple first adapters 03 are provided on each fiber splice and distribution module 00. An opening is provided at a position near the first adapters 03 on the splice and distribution frame body 20. A cabling ring 30 is disposed on one side of the opening. The fiber patch cord can pass through the cabling ring 30 and the opening on the splice and distribution frame body 20, and is connected to the first adapters 03 in the splice and distribution module 00. The multiple first adapters 03 need to connect to multiple fiber patch cords, and the cabling ring 30 can put the multiple fiber patch cords in order. Therefore, excessive disorder of the fiber patch cords is avoided.

As shown in FIG. 9, the splice and distribution frame body 20 includes a baseplate 201 and a baffle plate disposed around the baseplate; and the cabling ring 30 is disposed on each of outer sides of a first baffle plate 202 and a second baffle plate 203 in the splice and distribution frame body 20, where the first baffle plate 202 and the second baffle plate 203 are disposed opposite to each other, and are both perpendicular to a mounting plane of the first adapters 03.

Figure 10:
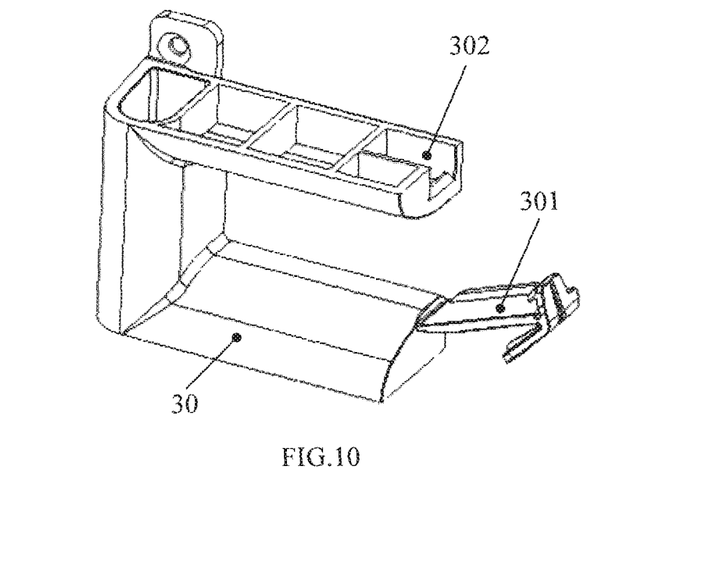
FIG. 10 is a schematic structural diagram of a cabling ring according to an embodiment of the present disclosure.

Further, as shown in FIG. 10, a movable clip 301 may be provided on the cabling ring 30. The cabling ring 30 can be opened or closed by using the movable clip 301, so as to arrange the multiple fiber patch cords. For example, as shown in FIG. 10, one end of the movable clip 301 is rotatably connected to the body of the cabling ring 30. The other end of the movable clip 301 is of a folded structure. The folded structure can be clipped in a clip groove 302 on the body of the cabling ring. When the fiber splice and distribution module needs to be taken out of the splice and distribution frame body or the fiber patch cord needs to be detached or arranged, the movable clip 301 on the cabling ring may be opened, so as to take out or detach the entire fiber patch cord.

Optionally, as shown in FIG. 9, the fiber splice and distribution frame may further include a tray 40; the tray 40 is disposed on the baseplate 201 of the fiber splice and distribution frame, and is movably connected to the baseplate 201; and the fiber splice and distribution module 00 is inserted on the tray. The fiber splice and distribution module 00 may be inserted on the tray 40 from a front face (that is, a face near the first adapters 03 in FIG. 9) of the fiber splice and distribution frame, or may be inserted on the tray 40 from a back face of the fiber splice and distribution frame. An inserting manner of the fiber splice and distribution module is relatively flexible. In addition, because the tray 40 is movably connected to the baseplate 201, the tray can be drawn out from the baseplate 201, so that operating personnel can perform different types of operations on the fiber splice and distribution module, for example, insert the fiber patch cord or repair or maintain the fiber splice and distribution module.

In this embodiment of the present disclosure, the fiber splice and distribution frame may be a 1-U splice and distribution frame, that is, the splice and distribution frame body may have a height of 44.45 millimeters, and have a width of 482.6 millimeters. It should be noted that 44.45 millimeters is the theoretical height of the 1-U splice and distribution frame. In an embodiment, the height of the splice and distribution frame body may be less than 44.45 millimeters to ensure that the fiber splice and distribution frame can be smoothly inserted on an optical distribution frame.

As shown in FIG. 9, in the splice and distribution frame body 20, four fiber splice and distribution modules may be sequentially inserted along a width direction x of the splice and distribution frame body. Compared with a related technology in which only two splice and distribution modules can be inserted into a 1-U fiber splice and distribution frame, the fiber splice and distribution module 00 provided in this embodiment of the present disclosure has a relatively small size and a more compact structure, so that four fiber splice and distribution modules may be inserted into the splice and distribution frame body. 12 SC adapters or 12 duplex LC adapters may be mounted in each fiber splice and distribution module. A quantity of ports can reach 48 for SC ports or 96 for LC ports in a full configuration, thereby effectively increasing port density of the fiber splice and distribution frame.

Optionally, the fiber splice and distribution frame may further include an upper cover; and the upper cover is disposed on a plane on which the opening of the splice and distribution frame body 20 is located, and is detachably connected to the splice and distribution frame body 20. For example, as shown in FIG. 9, the upper cover may include a first upper cover 501 and a second upper cover 502. When covering the splice and distribution frame body 20, the first upper cover 501 is located above the splice and distribution module 00. The second upper cover 502 and the first upper cover 501 can completely cover the opening of the splice and distribution frame body 20 by means of cooperation. The second upper cover 502 may be fixedly connected to the splice and distribution frame body 20. The first upper cover 501 may be detachably connected to the splice and distribution frame body 20 and the second upper cover 502, so as to operate or maintain components in the splice and distribution frame body 20 by detaching the first upper cover 501.

It should be noted that the splice and distribution frame body provided in the embodiments of the present disclosure may alternatively be a multi-U splice and distribution frame, for example, may be a 2-U or 3-U splice and distribution frame. This is not limited in the embodiments of the present disclosure.

To sum up, the present disclosure provides a fiber splice and distribution frame. There are many fiber splice and distribution modules inserted into the fiber splice and distribution frame, thereby effectively increasing port density of the fiber splice and distribution frame. In addition, a cabling ring is further provided on the fiber splice and distribution frame. The cabling ring can be opened or closed by using a movable clip, thereby effectively reducing a difficulty in detaching and arranging a fiber patch cord.

The foregoing descriptions are merely example embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A fiber splice and distribution apparatus comprising:
   a housing comprising multiple first adapters at a first end of the housing;
   a splice tray connected to the housing;
   a movable plate detachably connected to a second end of the housing, wherein the movable plate comprises an adapter mounting hole configured to mount a second adapter,
   wherein a first end of the second adapter is configured to connect to an external optical cable, wherein a second end of the second adapter is configured to connect to the multiple first adapters via a branch jumper, wherein when the movable plate is detached an opening is formed at the second end of the housing, wherein the external optical cable enters the housing through the opening, wherein the external optical cable is spliced to a first end of a pigtail by using the splice tray, and wherein a second end of the pigtail is configured to connect to the multiple first adapters.

2. The fiber splice and distribution apparatus of claim 1, wherein the splice tray is detachably connected to the housing, wherein when the movable plate is not connected to the housing, the splice tray is disposed in the housing, and wherein when the movable plate is connected to the housing, the splice tray is detached from the fiber splice and distribution apparatus.

3. The fiber splice and distribution apparatus of claim 1, wherein the movable plate is a knock-out hole.

4. The fiber splice and distribution apparatus of claim 1, wherein the housing comprises a baseplate and a baffle plate disposed around the baseplate, wherein the multiple first adapters are provided on the baffle plate at the first end of the housing; and the movable plate is provided on the baffle plate at the second end of the housing.

5. The fiber splice and distribution apparatus of claim 4, wherein the fiber splice and distribution apparatus further comprises a fiber post and a cover, wherein the fiber post is disposed on the baseplate, wherein the fiber post is configured to store the pigtail or the branch jumper, wherein the splice tray is disposed above the fiber post, wherein the splice tray is movably connected to the housing and is configured to turn over in a direction away from the baseplate, wherein the cover is disposed on a plane on which the opening of the housing is located, wherein the cover is movably connected to the baffle plate at the first end of the housing and is configured to turn over in a direction away from the baseplate.

6. The fiber splice and distribution apparatus of claim 1, wherein the multiple first adapters comprise any one of a square connector (SC) adapter, a Lucent connector (LC) duplex adapter, or a ferrule connector (FC) adapter, and wherein the second adapter comprises a multi-fiber push on (MPO) adapter.

7. A fiber splice and distribution frame comprising:
   a splice and distribution frame body; and
   at least one fiber splice and distribution component inserted into the splice and distribution frame body, wherein the fiber splice and distribution component comprises:
      a housing;
      a splice tray connected to the housing;
      multiple first adapters at a first end of the housing; and
      a movable plate at detachably connected to a second end of the housing, wherein the movable plate comprises an adapter mounting hole configured to mount a second adapter,
   wherein a first end of the second adapter is configured to connect to an external optical cable, wherein a second end of the second adapter is configured to connect to the multiple first adapters via a branch jumper, wherein when the movable plate is detached, an opening is formed at the second end of the housing, wherein the external optical cable enters the housing through the opening, wherein the external optical cable is spliced to a first end of a pigtail by using the splice tray, and wherein a second end of the pigtail is configured to connect to the multiple first adapters.

8. The fiber splice and distribution frame of claim 7, wherein an opening is provided at a position near a first adapter on the splice and distribution frame body, wherein a cabling ring is disposed on one side of the opening, wherein a fiber patch cord passes through the cabling ring and the opening on the splice and distribution frame body, and wherein the fiber patch cord is connected to the first adapter in the fiber splice and distribution component.

9. The fiber splice and distribution frame of claim 8, wherein the splice and distribution frame body comprises a baseplate, a first baffle plate disposed around the baseplate, and a second baffle plate disposed around the baseplate, wherein the cabling ring is disposed on each of outer sides of the first baffle plate and the second baffle plate in the splice and distribution frame body, wherein the first baffle plate and the second baffle plate are disposed opposite to each other, and wherein the first baffle plate and the second baffle plate are both perpendicular to a mounting plane of the first adapters.

10. The fiber splice and distribution frame of claim 8, wherein a movable clip is provided on the cabling ring, and wherein the movable clip is configured to open or close the cabling ring.

11. The fiber splice and distribution frame of claim 9, wherein the fiber splice and distribution frame further comprises a tray, wherein the tray is disposed on the baseplate of the fiber splice and distribution frame, wherein the tray is movably connected to the baseplate, and wherein the fiber splice and distribution component is inserted on the tray.

12. The fiber splice and distribution frame of claim 7, wherein the fiber splice and distribution frame further comprises an upper cover, wherein the upper cover is disposed on a plane on which the opening of the splice and distribution frame body is located, and wherein the upper cover is detachably connected to the splice and distribution frame body.

* * * * *